(12) United States Patent
Nagayama et al.

(10) Patent No.: US 6,631,475 B1
(45) Date of Patent: Oct. 7, 2003

(54) MICROCOMPUTER INCLUDING SYSTEM FOR CONTROLLING AND MAINTAINING THE ELECTRIC POTENTIAL OF AN INPUT TERMINAL TO IMPROVE INTERRUPT RESPONSE TIME

(75) Inventors: Hiroyuki Nagayama, Hyogo (JP); Hironari Yoshida, Hyogo (JP)

(73) Assignees: Mitsubishi Denki Kabushiki Kaisha, Tokyo (JP); Mitsubishi Electric System LSI Design Corporation, Hyogo (JP)

( * ) Notice: Subject to any disclaimer, the term of this patent is extended or adjusted under 35 U.S.C. 154(b) by 552 days.

(21) Appl. No.: 09/631,987

(22) Filed: Aug. 3, 2000

(30) Foreign Application Priority Data

Jan. 11, 2000 (JP) .......................................... 2000-002355

(51) Int. Cl.$^7$ ............................. G06F 1/30; G06F 13/24
(52) U.S. Cl. ........................ 713/300; 710/260; 713/322
(58) Field of Search ............................. 713/300, 322; 710/260, 264

(56) References Cited

U.S. PATENT DOCUMENTS 5,502,417 A * 3/1996 Uriya ........................... 327/541
5,860,013 A * 1/1999 Chan ........................... 710/260
5,968,159 A * 10/1999 Mattheis ...................... 710/264

FOREIGN PATENT DOCUMENTS

JP         04288625 A   * 10/1992   ............. G06F/9/22
JP         10-223388       8/1998

OTHER PUBLICATIONS

IBM, Microprocessor Interrupt Control, Nov. 1, 1985, vol. 28, Issue 6, pp. 2305–2306.*

* cited by examiner

*Primary Examiner*—Jeffrey Gaffin
*Assistant Examiner*—Suresh K Suryawanshi
(74) *Attorney, Agent, or Firm*—Leydig, Voit & Mayer, Ltd.

(57) ABSTRACT

A microcomputer has an electric potential control unit, a signal generation unit, and a timing signal generation circuit. The electric potential control unit includes a transistor which controls an electric potential of an input terminal which is energized by a power supply. The signal generation unit includes an input buffer circuit which receives a change in the electric potential of the input terminal and supplies an interrupt signal to a CPU. The timing signal generation circuit generates a timing signal which controls conductivity of a transistor and operates the transistor intermittently. A capacitor is connected to the input terminal.

7 Claims, 7 Drawing Sheets

MICROCOMPUTER INCLUDING SYSTEM FOR CONTROLLING AND MAINTAINING THE ELECTRIC POTENTIAL OF AN INPUT TERMINAL TO IMPROVE INTERRUPT RESPONSE TIME

FIELD OF THE INVENTION

The present invention relates to an input circuit of a microcomputer.

BACKGROUND OF THE INVENTION

Figure 6:
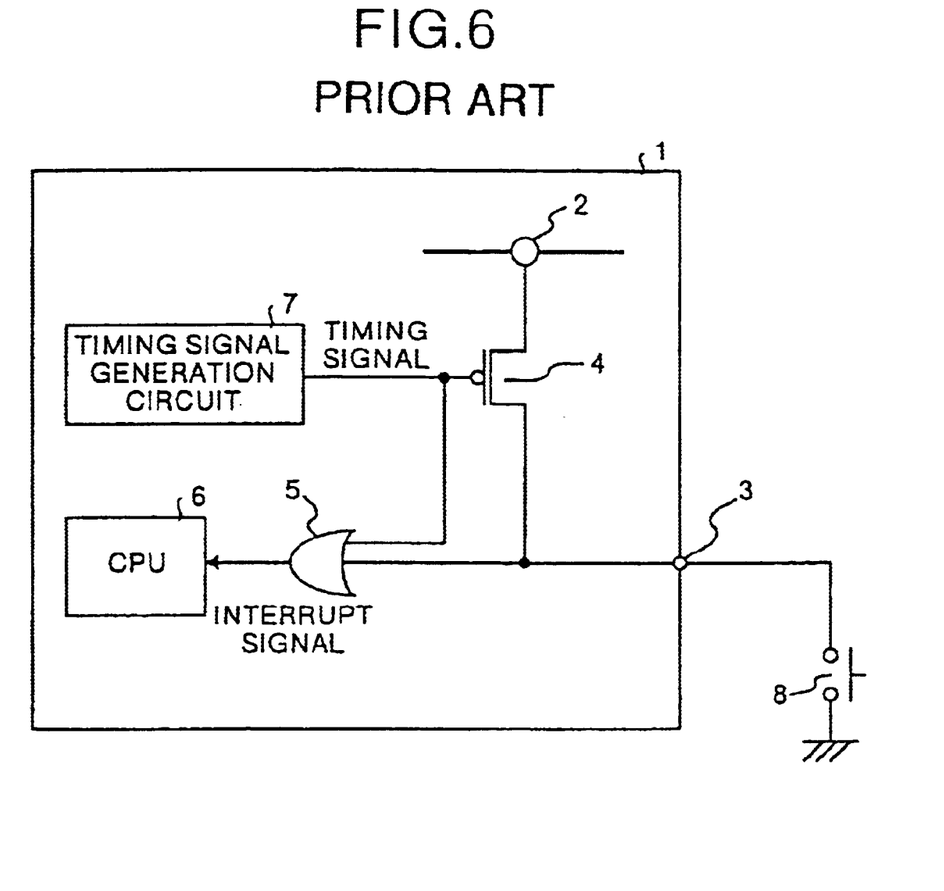
FIG. 6 is a circuit diagram showing a configuration according to a conventional art.

FIG. 6 shows a conventional microcomputer input circuit.

In this figure, 1 is a microcomputer, 2 is a power supply, 3 is an input terminal, 4 is a P-channel transistor, 5 is an OR circuit, 6 is a CPU, 7 is a timing signal generation circuit, and 8 is a switch.

Figure 7:
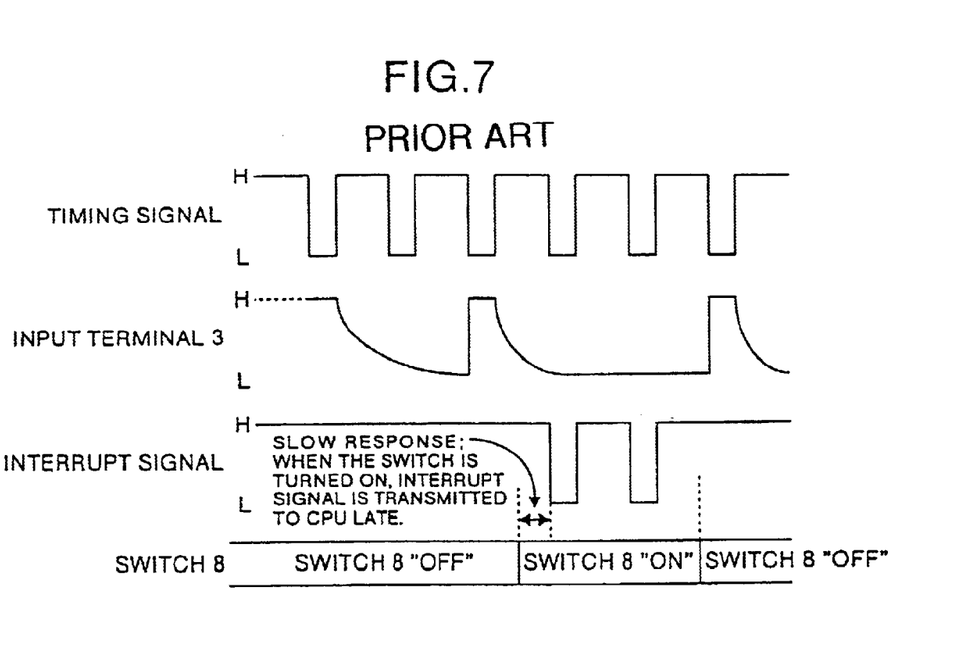
FIG. 7 is a timing chart showing an operation according to the conventional art.

FIG. 7 is a timing chart showing an operating state of FIG. 6.

A timing signal outputted from the timing signal generation circuit 7 operates at timing shown in FIG. 7.

The P-channel transistor 4 is turned "ON" intermittently by an output signal (timing signal) of the timing signal generation circuit 7. As a result, the electric current, which flows from the power supply 2 via the transistor 4, the input terminal 3 and the switch 8 to a ground with the switch 8 being ON, is reduced.

There will be explained below an operation while the switch 8 is OFF.

When the timing signal generation circuit 7 outputs a "Low"-level signal, the P-channel transistor 4 is turned ON, and the input terminal 3 is in "Hi" level.

When the timing signal generation circuit 7 outputs a "Hi"-level signal so that the P-channel pull-up transistor 4 is turned OFF, the input terminal 3 is in "Low" level.

When the switch 8 is turned ON, the input terminal is in "Low" level.

The CPU 6 receives an interrupt signal (a signal trailing from "Hi" level to "Low" level) so as to execute an interrupt process.

In order to generate the interrupt signal in FIG. 7, the switch 8 is turned ON, and the input terminal 3 is in "Low" level so that the timing signal is in "Low" level. The CPU 6 then recognizes the "Low" level via the OR circuit 5 (receives the interrupt signal) so as to execute the interrupt process.

As shown in FIG. 7, when the switch 8 is turned ON so that the interrupt signal is generated in the CPU 6, the input terminal 3 is brought into "Low" level. Further, when the timing of the timing signal TS is in "Low" level, the-output of the OR circuit 5 is in "Low" level. As a result, the interrupt signal of the CPU 6 is transmitted so that the interrupt process is executed. Therefore, there arise the following problems.

Problem 1: Even when the switch 8 is turned ON, the CPU 6 cannot receive the interrupt signal unless the timing signal is in "Low" level so that response is slow (see FIG. 7).

Problem 2: The timing signal generation circuit 7 which is for the exclusive use of performing an intermittent pull-up operation is required.

SUMMARY OF THE INVENTION

It is an object of the present invention to obtain a microcomputer improving response to an interrupt request.

According to one aspect of this invention, in a microcomputer, an electric potential control unit controls an electric potential of an input terminal. A signal generation unit detects a change in the electric potential of the input terminal due to an input signal, and then generates an internal signal. The electric potential control unit is operated intermittently. When the electric potential control unit is inoperative, an electric potential maintenance unit maintains the electric potential of the input terminal. Therefore, response to the interrupt request can be quicken.

Further, in the microcomputer, a capacitor is connected to the input terminal as the electric potential maintenance unit, and then maintains the electric potential of the input terminal to the input terminal.

Further, in the microcomputer, a pull-up transistor controls the electric potential of the input terminal which is energized by a power supply. An input buffer circuit receives the change in the electric potential of the input terminal, and then supplies an interrupt signal to a CPU. A timing signal generation circuit generates a timing signal which controls conductivity of the pull-up transistor, and then operates it intermittently. A capacitor is connected to the input terminal.

According to another aspect of this invention, in a microcomputer, an edge selection unit generates an internal signal in response to a specified edge of a signal change due to application of an input signal to an input terminal. An electric potential control operation which is performed by an electric potential control unit is brought into inoperative state according to the operation of the edge selection unit. Therefore, response to the interrupt request can be quicken.

According to still another aspect of this invention, in a microcomputer, an edge selection unit generates an internal signal in response to a specified edge of a signal change due to application of an input signal to an input terminal. An electric potential control operation which is performed by an electric potential control unit is brought into inoperative state according to the operation of the edge selection unit. A gate unit interrupts conductivity between the electric potential control unit and the input terminal according to the operation of the edge selection unit and returns the conductivity after predetermined time. A signal hold unit obtains the conductivity according to transition of the electric potential control unit to inoperative state, and then secures an input signal of the edge selection unit. Therefore, response to the interrupt request can be quicken.

According to still another aspect of this invention, in a microcomputer, an edge selection unit generates an internal signal in response to a specified edge of a signal change due to application of an input signal to an input terminal. A one-shot pulse generation circuit brings an electric potential control operation performed by an electric potential control unit into inoperative state according to the operation of the edge selection unit. A gate unit composed of a transmission gate controls conductivity between the electric potential control unit and the input terminal. A timing unit composed of a delay circuit and a NOR circuit control the gate unit according to the operation of the one-shot pulse generation circuit performed by the edge selection unit so that the conductivity between the electric potential control unit and the input terminal is interrupted and is returned after predetermined time. A signal hold unit composed of a P-channel transistor which obtains the conductivity according to transition of the electric potential control unit to inoperative state and secures an input signal of the edge selection unit. Therefore, response to the interrupt request can be quicken.

Other objects and features of this invention will become apparent from the following description with reference to the accompanying drawings.

DESCRIPTION OF THE PREFERRED EMBODIMENTS

Figure 1:
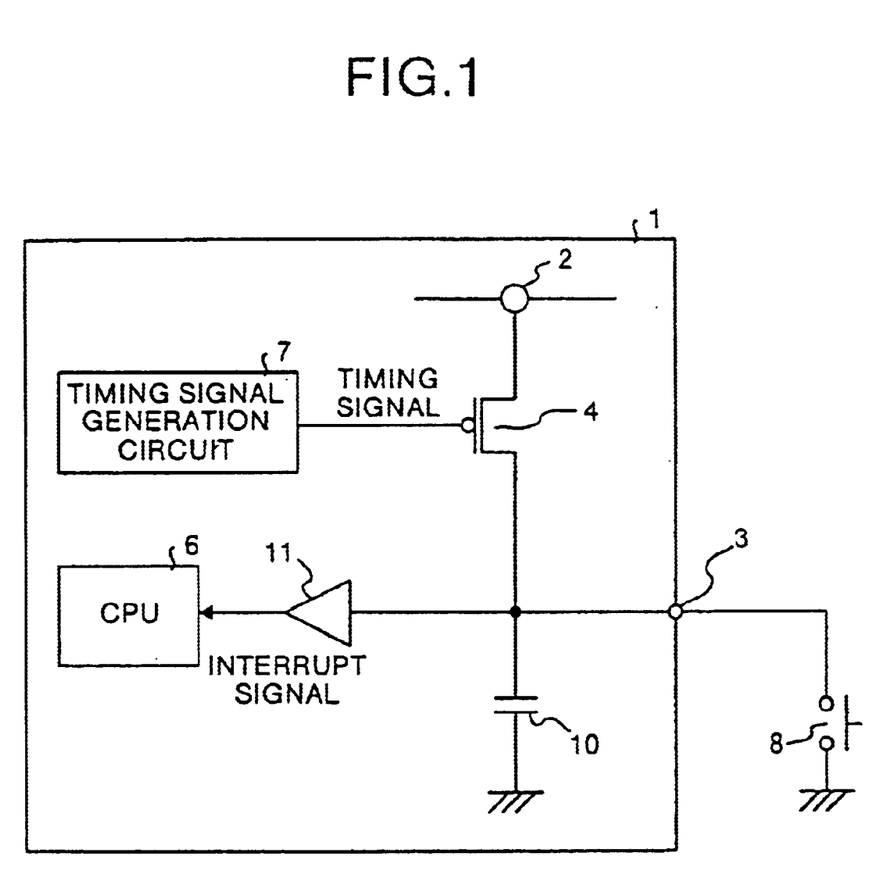
FIG. 1 is a circuit diagram showing a configuration according to a first embodiment of the present invention.
Figure 2:
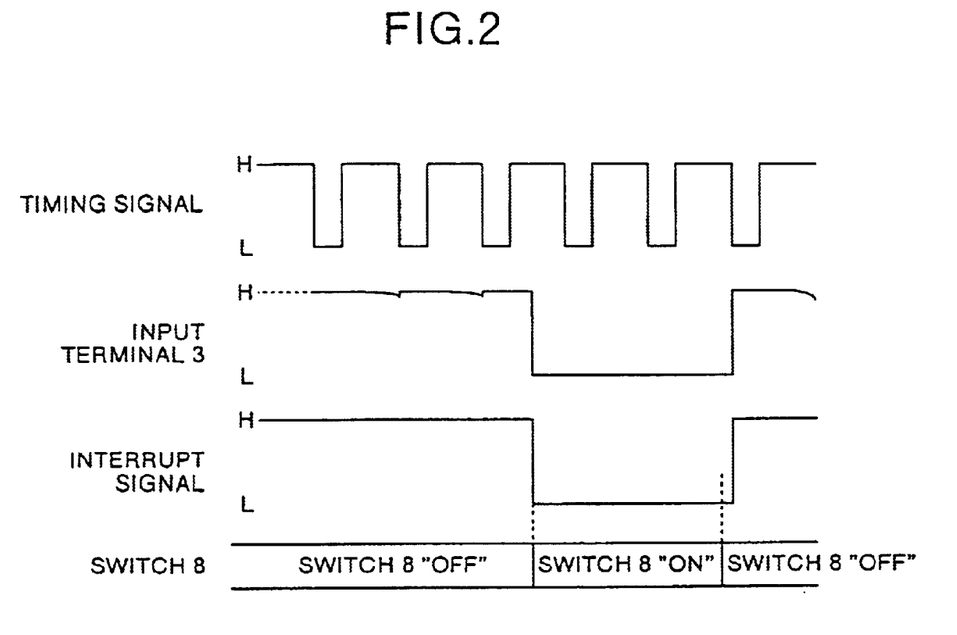
FIG. 2 is a timing chart showing an operation according to the first embodiment of the present invention.

A first embodiment of the present invention will now be explained with reference to FIG. 1 and FIG. 2. FIG. 1 is a circuit diagram showing a configuration according to the first embodiment. FIG. 2 is a timing chart showing an operation according to the first embodiment. In FIG. 1, the same reference numerals are given to the sections of the configuration which are the same as those in the conventional art.

The first embodiment is an example of solving the problem 1 mentioned above.

In FIG. 1, 1 is a microcomputer, 2 is a power supply, 3 is an input terminal, 4 is a P-channel transistor, 6 is a CPU, 7 is a timing signal generation circuit, 8 is a switch, 10 is a capacitor which holds "Hi" level, and 11 is an input buffer circuit.

FIG. 2 is a timing chart showing the operating state of FIG. 1.

An operation in the state that the switch 8 is OFF will now be explained.

When a timing signal is in "Low" level, the P-channel transistor 4 is turned ON and the input terminal 3 is brought into "Hi" level. At this time, the capacitor 10 is charged with electric charges.

When the timing signal is in "Hi" level, the P-channel transistor 4 is turned OFF. A path through which an electric potential directly from the power supply 2 is transmitted to the input terminal 3 is then not electrically conductive. However, the input terminal 3 is held in "Hi" level by the capacitor 10.

Thereafter, the switch 8 is turned ON. When the timing signal is in "Low" level, the input terminal 3 is grounded. When the timing signal is in "Hi" level, the electric charges of the capacitor 10 are discharged so as to bring the input terminal 3 into "Low" level.

The "Low"-level signal of the input terminal 3 is transmitted to the input buffer circuit 11, and the CPU 6 receives an interrupt signal so as to execute an interrupt process.

A difference from the conventional example is that the switch 8 is turned ON and the input terminal is brought into "Low" level and simultaneously the interrupt signal is transmitted to the CPU 6. Therefore, response to the interrupt request can be quicken, and a real-time characteristic can be improved.

According to the first embodiment of the present invention, the microcomputer 1 has an electric potential control unit, a signal generation unit and the timing signal generation circuit 7. The electric potential control unit includes the P-channel transistor 4 which is actuated by the power supply 2 and controls the electric potential of the input terminal 3. The signal generation unit includes the input buffer circuit 11 which receives a change in the electric potential of the input terminal 3 and supplies the interrupt signal to the CPU 6. The timing signal generation circuit 7 generates a timing signal which controls the conductivity of the P-channel transistor 4 and actuates it intermittently. The capacitor 10 is then connected to the input terminal 3. Therefore, the microcomputer having improved, quicker response to the interrupt request can be obtained.

Figure 3:
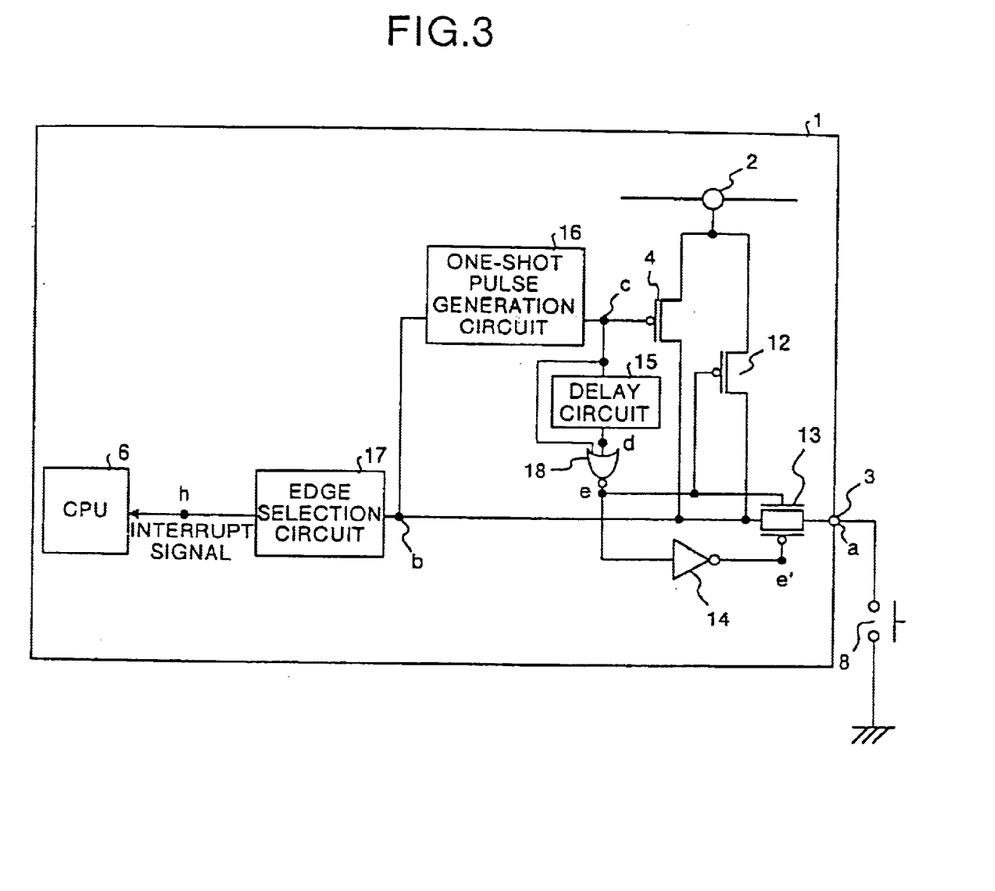
FIG. 3 is a circuit diagram showing a configuration according to a embodiment of the present invention.
Figure 4:
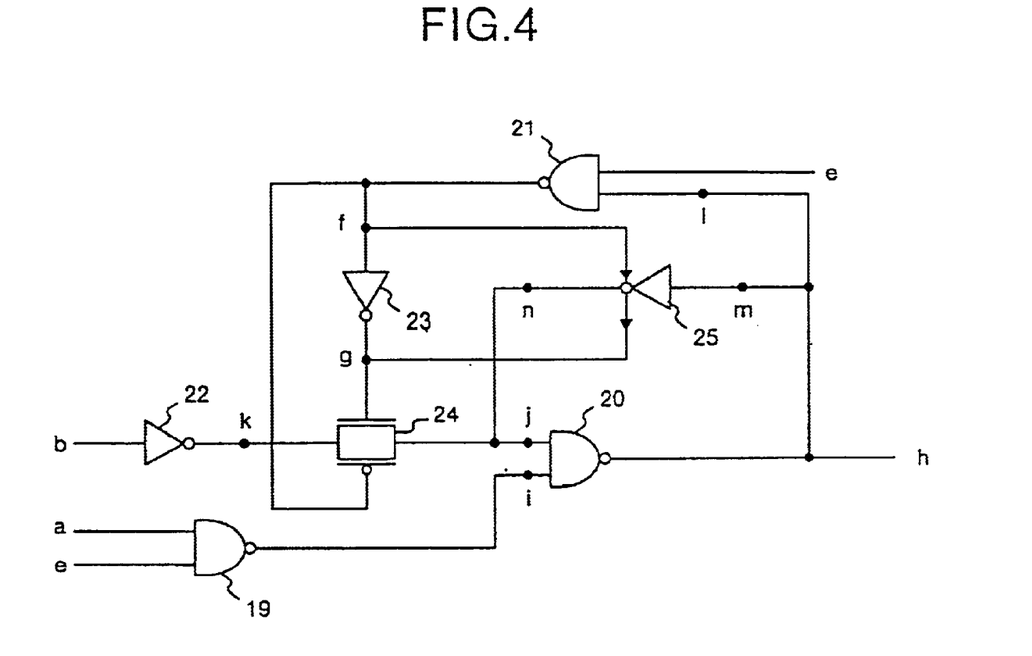
FIG. 4 is a circuit diagram showing a configuration of an edge selection circuit according to the second embodiment of the present invention.
Figure 5:
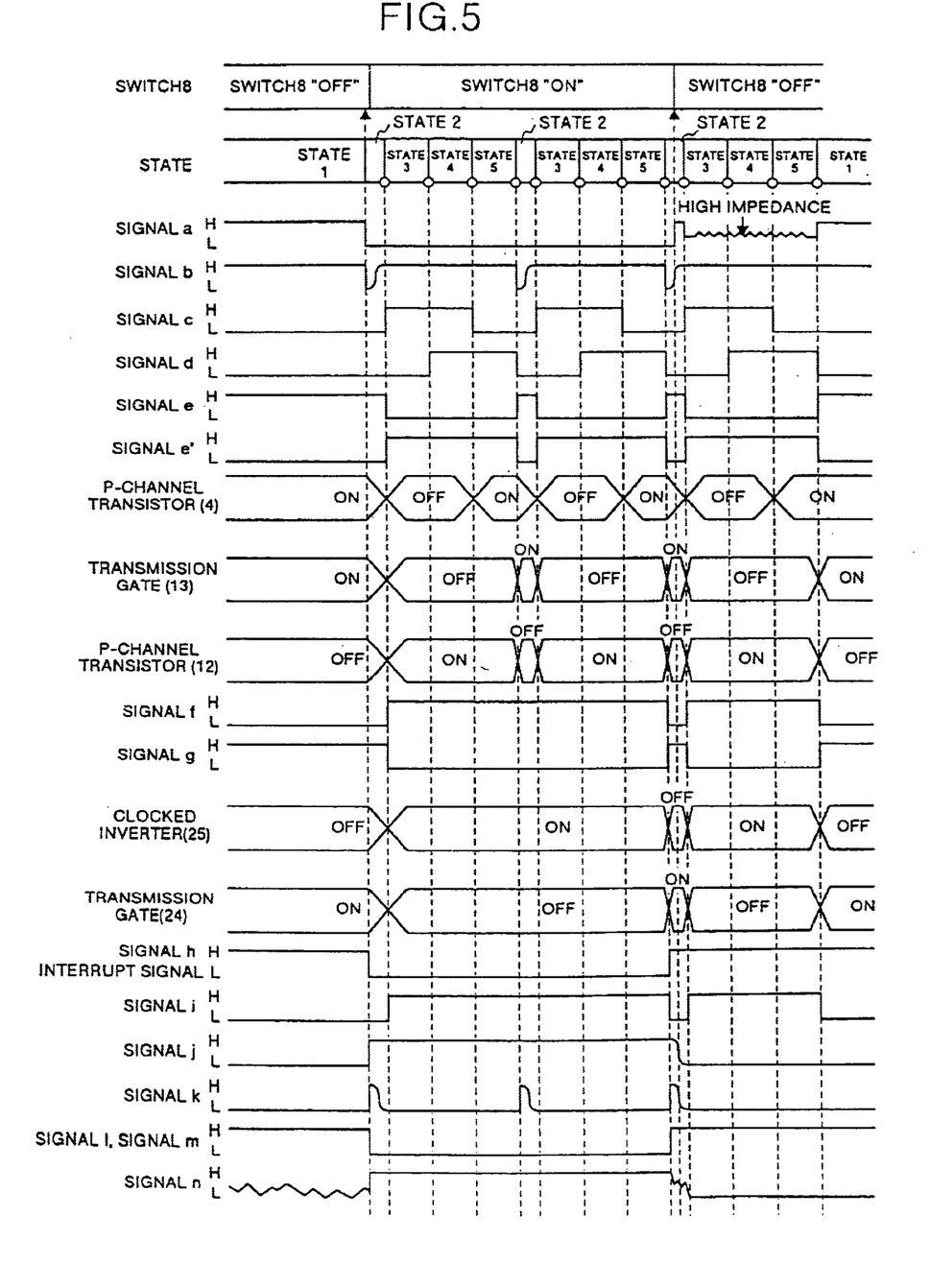
FIG. 5 is a timing chart showing an operation according to the second embodiment of the present invention.

A second embodiment of the present invention will now be explained with reference to FIGS. 3 through 5. FIG. 3 is a circuit diagram showing a configuration in the second embodiment, FIG. 4 is a circuit diagram showing a configuration of an edge selection circuit in the second embodiment, and FIG. 5 is a timing chart showing an operation in the second embodiment. In FIG. 3, the same reference numerals are given to the sections of the configuration which are the same as those in the conventional art and the first embodiment.

The second embodiment is an example of solving the problem 2 mentioned above.

In the drawing, 1 is a microcomputer, 2 is a power supply, 3 is an input terminal, 4 is a P-channel transistor, 12 is a P-channel transistor, 13 is a transmission gate, 14 is an-inverter circuit, 15 is a delay circuit, 16 is a one-shot pulse generation circuit which outputs a "Hi"-level signal at a trailing edge of an signal b, 17 is an edge selection circuit and 18 is a NOR circuit.

When the CPU 6 receives an interrupt signal (signal trailing from "Hi" level to "Low" level), the switch 8 is turned ON. Only a signal of the signal b (input signal of the edge selection circuit) which first trails is selected, and a signal which makes the CPU 6 execute an interrupt process (input signal h of the CPU 6 trailing from "Hi" level to "Low" level, hereinafter referred to as an interrupt signal) is transmitted. The CPU 6 accepts the interrupt request so as to execute the interrupt process.

Even if the period when the switch is ON is long, a trailing signal of the signal b at the second time and after is cut. As a result, the signal which makes the CPU execute the interrupt process is not transmitted.

FIG. 5 shows a timing chart of the second embodiment.

The operation in the state that the switch 8 is OFF (state 1 of FIG. 5) will now be explained . . . state 1.

When the one-shot pulse generation circuit 16 outputs a "Low"-level signal, the P-channel transistor 4 is turned ON.

The "Low"-level signal of an output signal c of the one-shot pulse generation circuit 16 is transmitted to an input terminal of the delay circuit 15 and an input terminal of the NOR circuit 18. However, the delay circuit 15 outputs a "Low"-level signal, and an output signal e of the NOR circuit 18 is in "Hi" level. This signal turns ON an N-channel side of the transmission gate 13.

The output signal e of the NOR circuit 18 is inverted via the inverter circuit 14, and an output signal e' of the inverter circuit 14 is in "Low" level. A P-channel side of the transmission gate 13 is turned ON so that the transmission gate 13 is turned ON.

At this time, since the P-channel transistor 4 is ON, the input terminal 3 (the input signal a of FIG. 3) is in "Hi" level.

The input signal b of the edge selection circuit 17 is also in "Hi" level because the P-channel transistor 4 is ON.

An operation just before the switch 8 is turned ON in the state that both the transmission gate 13 and the P-channel transistor 4 are ON, and the one-shot pulse generation circuit 16 outputs a "Hi"-level signal (state 2 of FIG. 5) will now be explained . . . state 2.

When the switch 8 is turned ON, the input terminal 3 is in "Low" level. Since the transmission gate 13 is ON, the input signal b of the edge selection circuit 17 trails from "Hi" level (state 1) to "Low" level (state 2).

The edge selection circuit 17 detects the first trailing at the time of the switch-ON, and an output signal h of the edge selection circuit 17 is changed from "Hi" level (state 1) into "Low" level. The interrupt request signal is transmitted to the CPU 6, and the CPU 6 receives the interrupt request so as to execute the interrupt process.

The input signal b of the one-shot pulse generation circuit 16 trails from "Hi" level (state 1) to "Low" level (state 2), and the one-shot pulse generation circuit 16 outputs a "Hi"-level signal. However, a "Hi"-level signal is not yet outputted here.

The output signal c of the one-shot pulse generation circuit 16 is held in "Low" level, and the P-channel transistor 4 is held in ON state. The input signal b of the edge selection circuit 17 trails from "Hi" level (state 1) to "Low" level (state 2) by turning the switch 8 ON. However, the input signal b is immediately brought into "Hi" level.

An input signal d of the NOR circuit 18 (signal from the delay circuit 15) is held in "Low" level because the output signal c of the one-shot pulse generation circuit 16 is held in "Low" level.

The input signal directly transmitted from the one-shot pulse generation circuit 16 is also in "Low" level, and the output signal e of the NOR circuit 18 is still in "Hi" level.

The transmission gate 13 is in the state 1, namely, in ON state.

An operation (state 3) just before the one-shot pulse generation circuit 16 outputs a "Hi"-level signal and the output signal d of the delay circuit 15 is in "Hi" level will now be explained . . . state 3.

The output signal c of the one-shot pulse generation circuit 16 is changed from "Low" level (state 2) into "Hi" level, and the P-channel transistor 4 is turned OFF.

An input signal d of the NOR circuit 18 (signal from the delay circuit 15) is held in "Low" level because the "Hi" level of the output signal c of the one-shot pulse generation circuit 16 is delayed and transmitted. The input signal directly transmitted from the one-shot pulse generation circuit 16 is in "Hi" level, and the output signal e of the NOR circuit 18 is brought into "Low" level.

The N-channel side of the transmission gate 13 is turned OFF by the "Low" level of the output signal e.

The P-channel side of the transmission gate 13 is brought into "Hi" level via the inverter circuit so as to be turned OFF.

The transmission gate 13 is then turned OFF and is non-conductive with the input terminal 3 (signal a).

The P-channel transistor 4 is turned OFF, however, the P-channel transistor 12 is turned ON, and the input signal b of the edge selection circuit is held in "Hi" level.

The input terminal 3 (signal a) is not conductive and is stabilized at "Low" level because the transmission gate 13 is turned OFF.

An interrupt signal h is held in "Low" level of the state 2.

The "Hi" level of the output signal c of the one-shot pulse generation circuit 16 is transmitted to the delay circuit 15, and the output signal d of the delay circuit 15 is in "Hi" level. The output signal c of the one-shot pulse generation circuit 16 is in "Low" level. An operation before this state (state 4) will now be explained . . . state 4.

At the time when the output signal d of the delay circuit 15 is brought into "Hi" level, the one-shot pulse generation circuit 16 is outputting "Hi" level signal. Both the output signal d of the delay circuit 15 and the output signal c of the one-shot pulse generation circuit 16 are in "Hi" level.

The output signal e of the NOR circuit 18 is held in "Low" level of the state 3.

The output signal e is in "Low" level, and the N-channel side of the transmission gate 13 is held in OFF state of the state 3.

Its P-channel side is also brought into "Hi" level via the inverter circuit so as to be turned OFF. The transmission gate 13 is held in the OFF state of the state 3 so as to be non-conductive with the input terminal 3 (signal a). The input terminal 3 (signal a) is held in the "Low" level of the state 3.

The P-channel transistor 4 is OFF and the P-channel transistor 12 is ON. The input signal b of the edge selection circuit is held in the "Hi" level which is the same as the state 3.

The interrupt signal h is held in "Low" level of the states 2 and 3.

The output signal c of the one-shot pulse generation circuit 16 is changed from "Hi" level into "Low" level, and the output signal d of the delay circuit 15 is in "Low" level. There will be explained below an operation just before this state (state 5) . . . state 5.

The output signal c of the one-shot pulse generation circuit 16 is in "Low" level while the delay circuit 15 is outputting a delayed signal and the output signal is in "Hi" level. The P-channel transistor 4 is turned ON.

The input signal d of the NOR circuit 18 (signal from the delay circuit 15) is in "Hi" level in the state that "Hi" level of the output signal c of the one-shot pulse generation circuit 16 is delayed and transmitted. The input signal directly transmitted from the one-shot pulse generation circuit 16 is in "Low" level, and the output signal e of the NOR circuit 18 is held in "Low" level of the states 3 and 4.

The output signal e is held in "Low" level, namely, in the states 3 and 4 on the N-channel side of the transmission gate 13. The P-channel side is brought into "Hi" level via the inverter circuit, and the transmission gate 13 is held in OFF state, namely, in the states 3 and 4 so as to be non-conductive with the input terminal 3 (signal a). The input terminal 3 (signal a) is held in "Low" level of the states 3 and 4.

The output signal e is held in "Hi" level, namely, in OFF of the states 3 and 4 on the N-channel side of the transmission gate 13. The P-channel side is brought into "Hi" level via the inverter circuit, and the transmission gate 13 is held in OFF of the states 3 and 4, namely, in the states 3 and 4 so as to be non-conductive with the input terminal 3 (signal a). The input terminal 3 (signal a) is maintains OFF of the states 3 and 4.

The P-channel transistor 4 is changed from OFF state (states 3 and 4) into ON state. The P-channel transistor 12 is held in ON state because the output signal of the NOR circuit 18 is in "Low" level. The input signal b of the edge selection circuit is held in "Hi" level which is the same as the states 3 and 4.

The interrupt signal h is held in "Low" level of the states 2, 3 and 4.

While the switch 8 is ON, transition of the states 2, 3, 4 and 5 occurs.

When the transition from the state 5 to the state 2 occurs, while the switch 8 is ON, and the output signal of the delay circuit 15 is changed from "Hi" level into "Low" level, the transmission gate 13 is turned ON.

When the transmission gate 13 is turned ON, "Low" level of the input terminal 3 is transmitted to the input terminal b of the edge selection circuit 17 because the switch 8 is ON. Thus, the edge selection circuit 17 receives a signal which trails from "Hi" level (state 5) to "Low" level, but the edge selection circuit 17 does not detect trailing signals other than the first one while the switch 8 is ON. The interrupt signal h is then held in "Low" level of the state 5.

When the switch 8 is turned OFF during the state 2 (just after the signal b trails from "Hi" level to "Low" level), since the P-channel transistor 4 is ON, the input terminal 3 (signal a) is changed from "Low" level into "Hi" level. At this time, the interrupt signal h is in "Hi" level via the edge selection circuit 17 (the detail will be explained in the embodiment of the edge selection circuit).

As shown in FIG. 7, since the transmission gate 13 is OFF in the state 3, it is non-conductive with the input terminal 3 (=signal a). Therefore, transition from the state 3 occurs without being influenced by a signal input from the input terminal 3.

The transmission gate 13 is OFF so as to be non-conductive with the input terminal 3 in the state 4. As a result, transition from the state 4 occurs directly without being influenced by a signal input from the input terminal 3.

The transmission gate 13 is OFF so as to be non-conductive with the input terminal 3 in the state 5. Transition from the state 5 occurs directly without being influenced by the input terminal 3.

When the output signal d of the delay circuit 15 is changed from "Hi" level into "Low" level in the state 5, the transmission gate 13 is turned ON. Since the output signal c of the one-shot pulse generation circuit 16 is in "Low" level, the P-channel transistor 4 is ON, and the input terminal 3 is in "Hi" level. The input signal b of the edge selection circuit 17 is held in "Hi" level, and the output signal c of the one-shot pulse generation circuit 16 is held in "Low" level.

Thereafter, since the P-channel transistor 4 or the P-channel transistor 12 is ON, the input signal b of the one-shot pulse generation circuit 16 is held in "Hi" level unless the switch is turned ON. Therefore, the one-shot pulse generation circuit 16 does not output a "Hi"-level signal.

Since the output signal d of the delay circuit 15 is in "Low" level, the output signal e of the NOR circuit 18 is in "Hi" level.

Since the output signal e is in "Hi" level, the N-channel side of the transmission gate 13 is turned ON. Since the output signal e of the inverter circuit 14 is in "Low" level, the P-channel side is turned ON. The transmission gate 13 is then changed from OFF state (states 3, 4 and 5) into ON state.

Since the output signal e of the NOR circuit is in "Hi" level, the P-channel transistor 12 is changed from OFF state (states 3, 4 and 5) into ON state. This is the state 1. When the switch 8 is turned OFF, the transition occurs from the time that the switch 8 is turned OFF into the state 5 and into the state 1.

The state 1 is held until the switch 8 is turned ON, and the state is maintained until the switch 8 is turned ON.

The CPU 6 receives the interrupt signal h via the edge selection circuit 17.

FIG. 4 shows one embodiment of the edge selection circuit 17.

19, 20 and 21 are NAND circuits. 22 and 23 are inverter circuits. 24 is a transmission gate. 25 is a clocked inverter circuit.

When a trailing edge is detected via the edge selection circuit 17, only at the time that the switch 8 is first turned ON. Even if the ON state of the switch 8 continues, trailing edges thereafter are not detected.

As for the signal h in the state 1 of FIG. 5 (interrupt signal h which is the output signal of the edge selection circuit 17 in FIG. 3), the signal a (input terminal 3 of FIG. 3) is in "Hi" level, and the signal e (input signal of the inverter circuit 14 in FIG. 3) is in "Hi" level. An input signal i of the NAND circuit 20 in FIG. 4 is brought into "Low" level.

When the input signal i of the NAND circuit 20 of FIG. 4 is in "Low" level, an output of the NAND circuit 20 is in "Hi" level whether an input terminal j of the NAND circuit 20 is in "Hi" level or "Low" level.

An input signal l of the NAND circuit 21 is in "Hi" level, and the signal e in the state 1 (input signal of the inverter circuit 14 of FIG. 3) is in "Hi" level as shown in FIG. 5. An output signal f of the NAND circuit 21 is in "Low" level.

An output signal g of the inverter circuit 23 is in "Hi" level.

When an input signal f of the inverter circuit 23 is in "Low" level and the output signal g of the inverter circuit 23 is in "Hi" level, the transmission gate 24 is in ON state.

The input signal b of the inverter circuit 22 in the state 1 (input signal of the one-shot pulse generation circuit 16 in FIG. 3) is in "Hi" level as shown in FIG. 5. An output signal k of the inverter circuit 22 is in "Low" level. Since the transmission gate 24 is ON, the input signal j of the NAND circuit 20 is in "Low" level, and the output of the NAND circuit 20 is in "Hi" level. Since the input signal f of the inverter circuit 23 is in "Low" level, the clocked inverter circuit 25 is turned OFF. The input signal j of the NAND circuit 20 is a "Low"-level signal obtained by inverting the "Hi"-level input signal b, and the interrupt signal h is stabilized at "Hi" level.

As for the interrupt signal h in the state 2 of FIG. 5, the signal a (input terminal 3 of FIG. 3) in FIG. 5 is in "Low" level, and the signal e (input signal of the inverter circuit 14 in FIG. 3) is in "Hi" level. The input signal i of the NAND circuit 20 is in "Hi" level. As for the input signal j of the NAND circuit 20 in FIG. 4, when the signal a is in "Low" level, the transmission gate 24 is turned ON, and the input signal b (input signal of the one-shot pulse generation circuit 16 in FIG. 3) is in "Low" level. The "Hi" level of the output signal k of the inverter circuit 20 brings the input signal j of the NAND circuit 22 into "Hi" level. The output signal of the NAND circuit 20 is in "Low" level.

At this time, the input signal to the CPU 6 trails from "Hi" level to "Low" level. Thus, the CPU 6 executes the interrupt process.

The input signal l of the NAND circuit 21 is in "Low" level, and the signal e in the state 2 (input signal of the inverter circuit 14 of FIG. 3) is in "Hi" level as shown in FIG. 5. The output signal f of the NAND circuit 21 is in "Hi" level.

The output signal g of the inverter circuit 23 is in "Low" level.

When the input signal f of the inverter circuit 23 is in "Hi" level and the output signal g of the inverter circuit 23 is in "Low" level, the transmission gate 24 is turned OFF.

Since the input signal f is in "Hi" level, the clocked inverter circuit 25 is turned ON. An input signal m of the clocked inverter circuit 25 is in "Low" level, and an output signal n is in "Hi" level. Therefore, the interrupt signal h is stabilized at "Low" level.

As for the interrupt signal h in the state 3 of FIG. 5, the signal a (input terminal 3 of FIG. 3) is in "Low" level, and the signal e (input signal of the inverter circuit 14 in FIG. 3) is in "Low" level. The output signal i of the NAND circuit 20 is in "Hi" level.

The input signal j of the NAND circuit 20 in FIG. 4 is held in "Hi" level of the state 2, and the output signal of the NAND circuit 20 is in "Low" level. The input signal 1 of the NAND circuit 21 is in "Low" level, and the signal e in the state 3 (input signal of the inverter circuit 14 of FIG. 3) is in "Low" level as shown in FIG. 5. The output signal f of the NAND circuit 21 is in "Hi" level.

When the input signal f of the inverter circuit 23 is in "Hi" level and the output signal g of the inverter circuit 23 is in "Low" level, the transmission gate 24 is turned OFF.

Since the input signal f is in "Hi" level, the clocked inverter circuit 25 is turned ON. The input signal m of the clocked inverter circuit 25 is in "Low" level, and the output signal n is in "Hi" level. As a result, the interrupt signal h is stabilized at "Low" level.

As for the interrupt signal h which is the output signal of the edge selection circuit 17 in the state 4 of FIG. 5, the signal a (input terminal 3 of FIG. 3) is in "Low" level, the signal e (input signal of the inverter circuit 14 of FIG. 3) is in "Low" level in FIG. 5. The input signal i of the NAND circuit 20 is in "Hi" level.

The input signal j of the NAND circuit 20 of FIG. 4 is held in "Hi" level of the state 3, and the output signal of the NAND circuit 20 is in "Low" level. The input signal 1 of the NAND circuit 21 is in "Low" level, and the signal e in the state 3 (input signal of the inverter circuit 14 of FIG. 3) is in "Low" level as shown in FIG. 5. The output signal f of the NAND circuit 21 is in "Hi" level.

When the input signal f of the inverter circuit 23 is in "Hi" level, and the output signal g of the inverter circuit 23 is in "Low" level, the transmission gate 24 is turned OFF.

Since the input signal f is in "Hi" level, the clocked inverter circuit 25 is turned ON. The input signal m of the clocked inverter circuit 25 is in "Low" level, and the output signal n is in "Hi" level. Therefore, the interrupt signal h is stabilized at "Low" level.

As for the interrupt signal h in the state 5 of FIG. 5, the signal a (input terminal 3 of FIG. 3) is in "Low" level, and the signal e (input signal of the transmission gate 13 of FIG. 3) is in "Low" level in FIG. 5. The output signal f of the NAND circuit 21 is in "Hi" level.

The input signal j of the NAND circuit 20 in FIG. 4 is held n "Hi" level of the state 4, and the output signal of the NAND circuit 20 is in "Low" level.

The input signal 1 of the NAND circuit 21 is in "Low" level, and the signal e in the state 5 (input signal of the inverter circuit 14 in FIG. 3) is in "Low" level as shown in FIG. 5. The output signal f of the NAND circuit 21 is in "Hi" level.

When the input signal f of the inverter circuit 23 is in "Hi" level and the output signal g of the inverter circuit 23 is in "Low" level, the transmission gate 24 is turned OFF. Since the input signal f is in "Hi" level, the clocked inverter circuit 25 is turned ON. The input signal m of the clocked inverter circuit 25 is in "Low" level, and the output signal n is in "Hi" level. Therefore, the interrupt signal h is stabilized at "Low" level.

The delay circuit 15 delays a signal received from the one-shot pulse generation circuit 16 so as to be outputted in the state 5. However, when this signal is changed from "Hi" level into "Low" level, the output signal e of the NOR circuit 18 is changed from "Low" level into "Hi" level.

Since the output signal e of the NOR circuit 18 is in "Hi" level in the case where the switch 8 is ON, the transmission gate 13 is turned ON, and the P-channel transistor 12 is turned OFF.

The input signal b of the edge selection circuit 17 trails from "Hi" level to "Low" level for an instant in the state that the P-channel transistor 12 is ON. The input signal b is brought into "Hi" level by turning ON the P-channel transistor 12. When the switch is kept ON in the state 5, the state 5 is changed into the state 2.

At this time, a signal which trails from "Hi" level to "Low" level is transmitted as the input signal b to the edge selection circuit 17.

As for the signal transition from the state 5 to state 2, the signal a is changed from "Low" level into "Low" level, the signal e is changed from "Low" level into "Hi" level. The signal b is changed from "Hi" level into "Low" level and then returned to "Hi" level.

The interrupt signal h in the state 5 is in "Low" level.

As for the operation of the edge selection circuit 17 at the time of the transition from the state 5 to the state 2, the signal a is in "Low" level and the signal e is in "Hi" level. For this reason, the input signal i of the NAND circuit 20 is in "Hi" level.

The input signal j of the NAND circuit 20 is held in "Hi" level of the state 5, and the output signal of the NAND circuit 20 is in "Low" level. The input signal e of the NAND circuit 21 is in "Hi" level, and the NAND circuit 21 outputs an "Hi"-level output signal.

When the input signal f of the inverter circuit 23 is in "Hi" level and the output signal g is in "Low" level, the transmission gate 24 is turned OFF. The clocked inverter circuit 25 is turned ON. Therefore, if the input signal b of the edge selection circuit 17 trails from "Hi" level to "Low" level, the interrupt signal h can be kept in "Low" level.

Namely, if the transition from the state 5 to the state 2 occurs in the state that the switch 8 is ON, the interrupt signal h is kept in "Low" level.

An operation that the switch 8 is turned OFF and the interrupt signal h leads will now be explained.

When the switch 8 is turned OFF in the state 2 (OFF just after the input signal of the edge selection circuit trails from "Hi" level to "Low" level), the transmission gate 13 is turned ON. The P-channel transistor 4 is turned ON, and the P-channel transistor 12 is turned OFF.

The signal a at that time is changed from "Low" into "Hi" level, and the signal b is held in "Hi" level. The signal e is held in "Hi" level.

The output signal of the NOR circuit 19 is in "Low" level. The NAND circuit 20 outputs an "Hi"-level signal whether the input signal j is in "Hi" level or in "Low" level. Therefore, the interrupt signal h leads from "Low" level to "Hi" level so as to be stabilized.

In the case where the switch 8 is turned OFF during the states 3, 4 and 5, similarly the signal a is in "Hi" level and the signal e is in "Low" level. The output signal of the NOR circuit 19 is in "Hi" level.

At the time of the states 3, 4 and 5, the transmission gate 24 is OFF and the clocked inverter circuit 25 is ON. Thus, the input signal j of the NAND circuit 20 depends on the output signal n of the clocked inverter circuit 25. The input signal j at that time is in "Low" level in the states 3, 4 and 5. Therefore, the interrupt signal h leads to "Hi" level so as to be stabilized.

When the trailing edge is detected via the edge selection circuit 17 only at the time that the switch 8 is first turned ON. Even if the ON state of the switch 8 continues, the trailing edges thereafter are not detected.

When the switch 8 of FIG. 3 is turned OFF, the transmission gate 13 of FIG. 3 is turned OFF in the states 3, 4 and 5 of FIG. 5. The input terminal 3 is in high-impedance state as represented by the signal a of FIG. 5.

When the state 5 is ended, the transmission gate is turned ON, and the transition to the state 1 occurs.

When the transition to the state 1 occurs, the state is maintained until the next interrupt signal is generated (until the switch 8 is turned ON).

A timing generation circuit which is for the exclusive use of controlling the P-channel transistor 4 is required in the conventional art. However, the interrupt signal is generated in the CPU 6 and simultaneously the P-channel transistor 4 can be turned OFF by the one-shot pulse generation circuit 16. The power supply 2 and the input terminal 3 are brought into non-conductive state by the delay circuit 15. Thus, DC current can be reduced.

Therefore, the response to the interrupt can be quickened, and a circuit such as the timing signal generation circuit 7 which controls the P-channel transistor 4 can be eliminated.

According to the second embodiment of the present invention, a microcomputer has an electric potential control unit and a signal generation unit. The electric potential control unit includes the P-channel transistor 4 which controls an electric potential of the input terminal 3. The signal generation unit detects a change in the electric potential of the input terminal 3 due to an input signal so as to generate an internal signal. The microcomputer is provided with an edge selection circuit 17, a one-shot pulse generation circuit 16, a gate unit, a timing unit and a signal hold unit. The edge selection circuit 17 includes the signal generation unit which generates the internal signal in response to a specified edge of a signal change due to application of the input signal to the input terminal. The one-shot pulse generation circuit 16 brings the electric potential control operation performed by the electric potential control unit into an inoperative state according to the operation of the edge selection circuit 17. The gate unit includes of the transmission gate 13 which controls conductivity between the electric potential control unit and the input terminal 3. The timing unit includes the delay circuit 15 and the NOR circuit 16 which control the gate unit according to the operation of the one-shot pulse generation circuit 16 performed by the edge selection unit so that the conductivity between the electric potential control unit and the input terminal 3 is interrupted and is returned after predetermined time. The signal hold unit is composed of the P-channel transistor 12 which brings the conductivity in accordance with transition of the electric potential control unit to an inoperative state so as to secure the input signal of the edge selection unit. Thus, an interrupt signal is generated securely by the edge selection unit including the edge selection circuit 17. The electric potential control unit including the P-channel transistor 4, the signal hold unit including the P-channel transistor 12, and the gate unit including the transmission gate 13 are controlled accurately. Therefore, the microcomputer has quickened response to the interrupt request.

According to one aspect of the present invention, the microcomputer has the electric potential control unit which controls an electric potential of the input terminal and the signal generation unit which detects a potential change of the input terminal due to an input terminal so as to generate an internal signal. The electric potential control unit is operated intermittently. The microcomputer is provided with an electric potential maintenance unit which maintains the electric potential of the input terminal when the electric potential control unit is inoperative. Therefore, the microcomputer which is capable of suitably improving the quick response to the interrupt request can be obtained.

Further, in the microcomputer, a capacitor is connected as the electric potential maintenance unit which maintains the electric potential of the input terminal to the input terminal. Therefore, the microcomputer which is capable of suitably improving the quick response to the interrupt request can be obtained by the capacitor connected with the input terminal.

Further, the microcomputer has a pull-up transistor, an input buffer circuit and a timing signal generation circuit. The pull-up transistor which is energized by the power supply and controls the electric potential of the input terminal. The input buffer circuit receives a change in the electric potential of the input terminal so as to supply the interrupt signal to the CPU. The timing signal generation circuit generates a timing signal which controls conductivity of the pull-up transistor so as to operate it intermittently. A capacitor is connected to the input terminal. Therefore, the microcomputer which is capable of suitably improving the quick response to the interrupt request can be obtained by the capacitor connected with the input terminal whose electric potential is controlled by the pull-up transistor operating intermittently.

According to another aspect of the present invention, the microcomputer has the electric potential control unit which controls an electric potential of the input terminal and the signal generation unit which detects a change in the electric potential of the input terminal due to an input signal so as to generate an internal signal. The microcomputer is provided with an edge selection unit which generates an internal signal in accordance with a specified edge of a signal change due to the application of the input signal to the input terminal. The electric potential control operation which is performed by the electric potential control unit is brought into inoperative state according to the operation of the edge selection unit. Therefore, the microcomputer which is capable of suitably improving the quick response to the interrupt request can be obtained by the accurate operation of the edge selection unit.

According to still another aspect of the present invention, the microcomputer has the electric potential control unit which controls an electric potential of the input terminal and the signal generation unit which detects a change in the electric potential of the input terminal due to an input signal so as to generate an internal signal. The microcomputer is provided with the edge selection unit which generates an internal signal in accordance with a specified edge of a signal change due to the application of the input signal to the input terminal. The electric potential control operation which is performed by the electric potential control unit is brought into inoperative state according to the operation of the edge selection unit. The microcomputer is further provided with a gate unit and a signal hold unit. The gate unit interrupts the conductivity between the electric potential control unit and the input terminal according to the operation of the edge selection unit and returns the conductivity after predetermined time. The signal hold unit brings the conductivity according to the transition of the electric potential control unit to inoperative state so as to secure an input signal of the edge selection unit. Therefore, the microcomputer which is capable of suitably improving the quick response to the interrupt request can be obtained by the accurate operations of the edge selection unit, the gate unit and the signal hold unit.

According to still another aspect of the present invention, the microcomputer has the electric potential control unit and the signal generation unit. The electric potential control unit is composed of the P-channel transistor which controls an electric potential of the input terminal. The signal generation unit detects a change in the electric potential of the input terminal due to an input signal so as to generate an internal signal. The microcomputer is provided with an edge selection unit and a one-shot pulse generation circuit. The edge selection unit generates an internal signal in response to a specified edge of a signal change due to the application of the input signal to the input terminal. The one-shot pulse generation circuit brings the electric potential control operation performed by the electric potential control unit into inoperative state according to the operation of the edge selection unit. The microcomputer is further provided with a gate unit, a timing unit and a signal hold unit. The gate unit is composed of the transmission gate which controls conductivity between the electric potential control unit and the input terminal. The timing unit is composed of the delay circuit and the NOR circuit which control the gate unit according to the operation of the one-shot pulse generation circuit performed by the edge selection unit so that the conductivity between the electric potential control unit and the input terminal is interrupted and the conductivity is returned after predetermined time. The signal hold unit is composed of the P-channel transistor which brings the conductivity according to transition of the electric potential control unit to inoperative state and secures an input signal of the edge selection unit. An interrupt signal is generated securely by the edge selection unit composed of the edge selection circuit. The electric potential control unit composed of the P-channel transistor, the signal hold unit composed of the P-channel transistor and the gate unit composed of the transmission gate are controlled accurately. Therefore, the microcomputer which is capable of suitably improving the quick response to the interrupt request can be obtained.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A microcomputer comprising:
   an input terminal;
   an electric potential control unit which controls electric potential of said input terminal;
   a signal generation unit which detects a change in the electric potential of said input terminal due to an input signal and, in response, an internal signal, said electric potential control unit being operated intermittently; and
   an electric potential maintenance unit which maintains the electric potential of said input terminal when said electric potential control unit is inoperative.

2. The microcomputer according to claim 1, wherein said electric potential maintenance unit, which maintains the electric potential of said input terminal, is a capacitor.

3. The microcomputer according to claim 1, further comprising:
   a pull-up transistor which controls the electric potential of said input terminal and which is energized by a power supply;
   a input buffer circuit which receives the change in the electric potential of said input terminal and, in response, supplies an interrupt signal to a CPU;
   a timing signal generation circuit which generates a timing signal which controls conductivity of said pull-up transistor so as to operate said pull-up transistor intermittently; and
   a capacitor connected to said input terminal.

4. A microcomputer comprising:
   a input terminal;
   an electric potential control unit which controls an electric potential of said input terminal;
   a signal generation unit which detects a change in the electric potential of said input terminal due to an input signal and, in response, generates an internal signal; and
   an edge selection unit which generates an internal signal in response to a signal change in only one direction due to application of the input signal to said input terminal, wherein an electric potential control operation performed by said electric potential control unit is brought into an inoperative state according to operation of said edge selection unit.

5. A microcomputer comprising:
   an input terminal;
   an electric potential control unit which controls an electric potential of said input terminal;
   a signal generation unit which detects a change in the electric potential of said input terminal due to an input signal and, in response, generates an internal signal;
   an edge selection unit which generates an internal signal in response to a signal change in only one direction due to application of the input signal to said input terminal, wherein an electric potential control operation performed by said electric potential control unit is brought into an inoperative state according to operation of said edge selection unit;
   a gate unit which interrupts conductivity between said electric potential control unit and said input terminal according to the operation of said edge selection unit restores the conductivity after a time period; and
   a signal hold unit which becomes conductive according to a transition of said electric potential control unit to the inoperative state to secure an input signal of said edge selection unit.

6. The microcomputer according to claim 5 further comprising:
   a one-shot pulse generating circuit which changes the electric potential control operation of said electric potential control unit to a non-conducting state based on the operation of said edge selection unit; and
   a time-dependent unit which controls, depending upon the operation of said one-shot pulse generating circuit, which, in turn, depends upon the operation of said edge selection unit, said gate unit to interrupt conductivity between said electric potential control unit and said input terminal, said gate unit to restore the conductivity after a time period.

7. The microcomputer according to claim 5 wherein said electric potential control unit has a p-channel transistor that controls the electric potential of said input terminal and said signal hold unit has a p-channel transistor that secures the input signal of said edge selection unit.

* * * * *